(12) United States Patent  (10) Patent No.: US 7,375,474 B2
Lee  (45) Date of Patent: May 20, 2008

(54) APPARATUS AND METHOD FOR DRIVING BACKLIGHT

(75) Inventor: Tae Wook Lee, Ulsan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/402,922

(22) Filed: Apr. 13, 2006

(65) Prior Publication Data

US 2006/0232228 A1  Oct. 19, 2006

(30) Foreign Application Priority Data

Apr. 18, 2005 (KR) .................. 10-2005-0032034

(51) Int. Cl.
*H05B 3/02* (2006.01)
(52) U.S. Cl. ............ 315/308; 315/308; 315/291; 315/209 R
(58) Field of Classification Search ............ 315/307, 315/308, 209 R, 291, 219, 224–226, 212, 315/312, DIG. 7; 345/102

See application file for complete search history.

(56) References Cited

U.S. PATENT DOCUMENTS 6,326,740 B1 * 12/2001 Chang et al. ............ 315/291
2005/0242752 A1 * 11/2005 Lyle et al. ............... 315/291

* cited by examiner

*Primary Examiner*—Trinh Dinh
*Assistant Examiner*—Dieu Hien T Duong
(74) *Attorney, Agent, or Firm*—Seyfarth Shaw, LLP

(57) ABSTRACT

The apparatus for driving a backlight includes a plurality of lamps each of which has first and second electrodes, a transformer for receiving an AC waveform to provide high voltage AC waveform to drive the plurality of lamps, a detection circuit for generating a detection voltage corresponding to the high voltage AC waveform, an accumulation operation unit for accumulating the detection voltage from the detection circuit and generating a shutdown signal voltage, and a controller for receiving an input voltage to provide the AC waveform to the transformer and for receiving the shutdown signal voltage to shutdown the plurality of lamps in response to the shutdown signal voltage.

15 Claims, 4 Drawing Sheets

APPARATUS AND METHOD FOR DRIVING BACKLIGHT

This application claims the benefit of Korean Patent Application No. P2005-0032034, filed on Apr. 18, 2005, which is hereby incorporated by reference in its entirety.

BACKGROUND OF THE INVENTION

1. Field of the Invention

The present invention relates to a backlight, and more particularly, to apparatus and method for driving a backlight. Although the present invention is suitable for a wide scope of applications, it is particularly suitable for preventing malfunction of a shutdown circuit.

2. Discussion of the Related Art

Generally, a liquid crystal display (referred to as "LCD") has the characteristics of light weight, thin profile, low power consumption. Because of these characteristics, the LCD has been used for many applications. For example, the LCD is used in televisions, computer monitors and other types of video devices. The LCD generates images according to video signals by controlling the transmission of light through the LCD. Thus, an LCD requires a light source, such as a backlight, because the LCD itself does not emit light.

The types of light sources used for a backlight include a halogen cathode fluorescent tube and a cold cathode fluorescent tube (CCFL). The CCFL is a light tube that emits light through a cold emission phenomenon such that electrons are emitted from the surface of a cathode when strong electric fields are applied across the light tube. The CCFL is used in applications that require low heat emission, high brightness, long lifetime and full color. A backlight that uses a CCFL can either be a light waveguide type backlight, a direct incident type backlight or a reflection type backlight.

The CCFL can either be an internal electrode fluorescent lamp in which electrodes are formed inside the light tube or an external electrode fluorescent lamp in which electrodes are formed outside the light tube. Such fluorescent lamps are driven by a high voltage AC waveform. The high voltage AC waveform for driving the fluorescent lamps is obtained by a DC voltage from a DC voltage source being converted to a low voltage AC waveform by an inverter and then the low voltage AC waveform is stepped up to a high voltage AC waveform by a transformer.

FIG. 1 illustrates a schematic block diagram of an apparatus for driving a backlight according to the related art. As shown in FIG. 1, the apparatus for driving a backlight of the related art includes a plurality of lamps 10, each of which has first and second electrodes. A transformer 20 provides a high voltage AC waveform to drive the plurality of lamps 10 in parallel. A shutdown circuit 30 generates a shutdown signal voltage Vsd based on the high voltage AC waveform output from the transformer 20. A controller 40 converts an input voltage Vin into an AC waveform that is provided to the transformer 20 and performs shutdown of the AC waveform being provided to the transformer 20 in response to the shutdown signal from the shutdown circuit. When the AC waveform being provided to the transformer 20 is shutdown, the high voltage AC waveform is shutdown to the plurality of lamps 10.

The plurality of lamps 10 emits light in response to the high voltage AC from the transformer 20. The first electrode of each of the plurality of lamps 10 is commonly connected to an output lead N1 of the transformer 20, and the second electrode of each of the plurality of lamps 10 is electrically grounded to the earth. A first capacitor Ca is electrically located between each first electrode of the plurality of lamps 10 and the output lead N1 of the transformer 20, and a second capacitor Cb is electrically connected between each second electrode of the plurality of lamps 10 and the ground source. The first and second capacitors Ca and Cb balance currents among the plurality of lamps 10 to prevent non-uniformity of brightness among the plurality of lamps 10.

The transformer 20 includes a primary coil L1 receiving an AC waveform from the controller 40 and a secondary coil L2 commonly connected to the plurality of lamps 10. The transformer 20 raises the AC waveform input via the primary coil L1 such that a high voltage AC waveform can be induced in the secondary coil L2 according to a winding ratio of the first coil L1 and secondary coil L2. Therefore, the high voltage AC waveform induced in the secondary coil L2 is output via the output lead N1 to the first electrode of each of the lamps 10.

The controller 40 converts an input voltage Vin provided from an external source into an AC waveform and then provides the AC waveform to the primary coil L1 of the transformer 20. The controller 40 includes at least one switching element (not shown) for converting the input voltage Vin to the AC waveform and a switching controlling unit (not shown) for controlling the switching element. The switching element is switched according to a switching control signal of the switching controlling unit to convert the input voltage Vin to the AC waveform and then to provide the AC waveform to the primary coil L1 of the transformer 20. The switching controlling unit generates such a switching control signal to control the switching element, and turns off the switching element according to the shutdown signal provided from the shutdown circuit 30, to cut off the high voltage AC waveform provided to the primary coil L1 of the transformer 20, thereby performing shutdown of the apparatus for driving a backlight.

The shutdown circuit 30, which is electrically connected to the output lead N1 of the transformer 20, generates a shutdown signal Vsd, in response to the high voltage AC waveform which is provided to the plurality of lamps 10, and then provides the shutdown signal to the controller 40. Namely, the shutdown circuit 30 generates the shutdown signal voltage Vsd to perform shutdown of the apparatus for driving a backlight in response to voltage variations caused by abnormal operation of the plurality of lamps 10.

FIG. 2 illustrates a detailed circuit diagram illustrating a shutdown circuit of FIG. 1. As shown in FIG. 2, the shutdown circuit 30 includes a voltage detection circuit 32 located between the output lead N1 of the transformer 20 and the ground source, and a comparator 34 located between the voltage detection circuit 32 and the controller 40. The voltage detection circuit 32 includes first and second capacitors C1 and C2, which are serially connected between the output lead N1 and the ground source, and first and second diodes D1 and D2, which are located between a voltage divider node N2 and the comparator 34, in which the voltage divider node N2 is between the first and second capacitors C1 and C2. The first and second capacitors C1 and C2 serve to smooth the voltage corresponding to the high voltage AC waveform output from the output lead N1 of the transformer 20, and to perform voltage division such that a divided voltage can be output to the voltage divider node N2.

The anode of the first diode D1 is electrically connected to the voltage divider node N2 and the cathode thereof is connected to the comparator 34. The cathode of the second diode D2 is connected to the voltage divider node N2 and the anode thereof is connected to the ground source. Such first and second diodes D1 and D2 rectify the voltage of the voltage divider node N2 and provide the rectified detection voltage to the comparator 34.

The comparator 34 includes first and second input leads, in which the first input lead is electrically connected to the cathode of the first diode D1 to input the detection voltage Vsen thereto, and the second input lead is electrically connected to the ground source to input voltage Vref thereto. Such a comparator 34 compares the detection voltage Vsen provided through the first input lead to the reference voltage Vref provided through the second input lead and then generates the shutdown signal voltage Vsd, which is provided to the controller 40. More specifically, the comparator 34 generates an OFF state shutdown signal if the detection voltage Vsen is greater than the reference voltage Vref or an ON state shutdown signal if the detection voltage Vsen is less than the reference voltage Vref. Such a shutdown circuit 30 detects voltage variation of the high voltage AC waveform, which is provided to the lamps 10, and then provides an OFF state shutdown signal to the controller, if each of the plurality of lamps 10 is normally driven. On the other hand, if each of the lamps 10 is abnormally driven, such as an open operation, the shutdown circuit 30 provides an ON state shutdown signal to the controller 40.

The apparatus for driving a backlight according to the related art converts the input voltage Vin to a high voltage AC waveform using the switching element of the controller 40 and the transformer 20, and then provides the AC high voltage to the plurality of lamps 10 in parallel such that each of the lamps 10 can be lit. While the plurality of lamps 10 is driven in parallel by the high voltage AC waveform, the detection voltage Vsen responds to the voltage variation of the high voltage AC waveform output from the transformer 20 and the shutdown circuit 30 provides the ON state shutdown signal to the controller 40 if the detection voltage Vsen is greater than the reference voltage Vref. Therefore, the controller turns off the switching element in response to the ON state shutdown signal such that the apparatus for driving a backlight can be shut down.

The detection voltage Vsen detected by the shutdown circuit 30 is affected by the electrical states of the plurality of lamps 10, such as open, short, and abnormal light. However, the detection voltage Vsen may be sensitive to peripheral temperature and/or changes of characteristics of circuit elements, which are included in the shutdown circuit 32. Therefore, although the plurality of lamps 10 are operating normally, the detection voltage Vsen can be affected by a peripheral temperature change and/or change of characteristics of the circuit elements in the shutdown circuit 32 such that the shutdown circuit 30 recognizes the plurality of lamps 10 to be in an abnormal state and then generates the ON state shutdown signal to shut down the backlight when the backlight should not be shut down. In another circumstance, when one of the plurality of lamps 10 is opened, the detection voltage Vsen can be affected by a peripheral temperature change and/or change of characteristics of the circuit elements in the shutdown circuit 32 such that the shutdown circuit 30 recognizes the plurality of lamps 10 to be operating normally and then generates the OFF state shutdown signal to maintain operation of the backlight when the backlight should be shut down. Consequently, the apparatus for driving a backlight of the related art has disadvantages in that it cannot correctly detect a state of the plurality of lamps 10 due to malfunction of the shutdown circuit 30, which is caused by change of peripheral temperature or change of characteristics of circuit elements in the shutdown circuit 32.

SUMMARY OF THE INVENTION

Accordingly, the present invention is directed to an apparatus and method for driving a backlight that substantially obviate one or more problems due to limitations and disadvantages of the related art.

An object of the present invention is to provide an apparatus and method for driving a backlight that prevents malfunction of a shutdown circuit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a backlight includes a plurality of lamps each of which has first and second electrodes, a transformer for receiving an AC waveform to provide high voltage AC waveform to drive the plurality of lamps, a detection circuit for generating a detection voltage corresponding to the high voltage AC waveform, an accumulation operation unit for accumulating the detection voltage from the detection circuit and generating a shutdown signal voltage, and a controller for receiving an input voltage to provide the AC waveform to the transformer and for receiving the shutdown signal voltage to shutdown the plurality of lamps in response to a shutdown signal.

In another aspect of the present invention, a method for driving a backlight including a plurality of lamps each of which has first and second electrodes includes converting an input voltage to an AC waveform, converting the AC waveform to a high voltage AC waveform using a transformer and providing the high voltage AC waveform to drive the plurality of lamps, generating a detection voltage corresponding to the high voltage AC waveform output from the transformer to the plurality of lamps, and accumulating the detection voltage during each clock signal and generating a shutdown signal voltage using the accumulated detection voltage.

In yet another aspect, an apparatus for driving a backlight includes a plurality of lamps each of which has first and second electrodes, a transformer for receiving an AC waveform to provide high voltage AC waveform to drive the plurality of lamps, a clock for providing a clock signal, a detection circuit for generating a detection voltage corresponding to the high voltage AC waveform, an accumulation operation unit for receiving the detection voltage from the detection circuit each clock signal and generating a shutdown signal voltage during each clock signal, and a controller for receiving an input voltage to provide the AC waveform to the transformer and for receiving the shutdown signal voltage during each clock signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
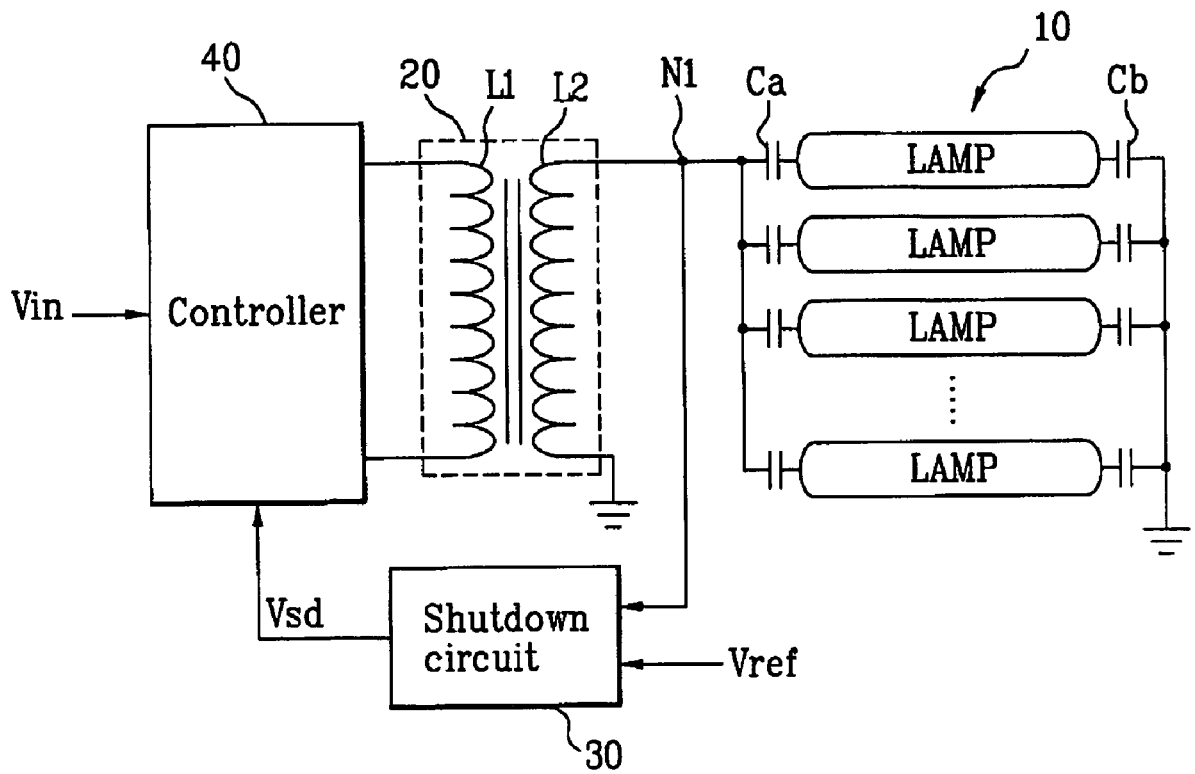
FIG. 1 illustrates a schematic block diagram of an apparatus for driving a backlight according to the related art.
Figure 2:
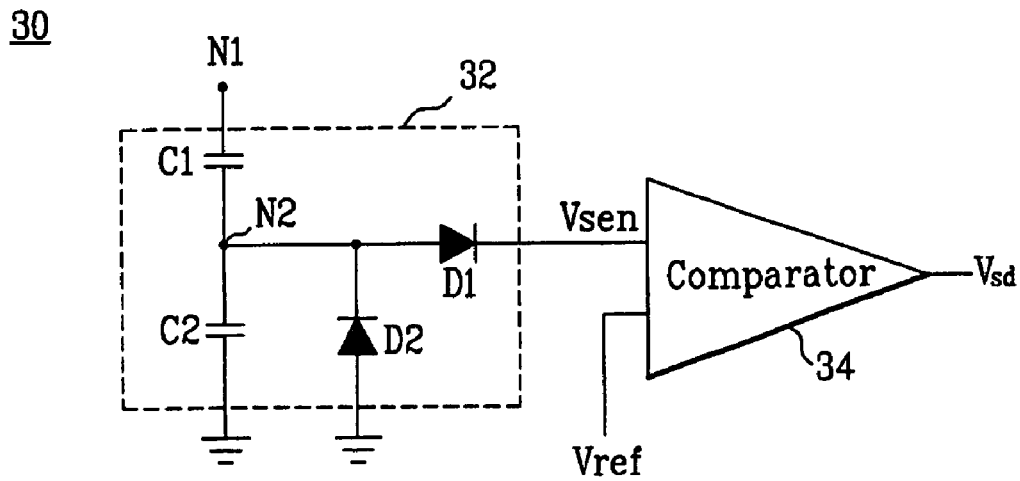
FIG. 2 illustrates a detailed circuit diagram illustrating a shutdown circuit of FIG. 1.
Figure 3:
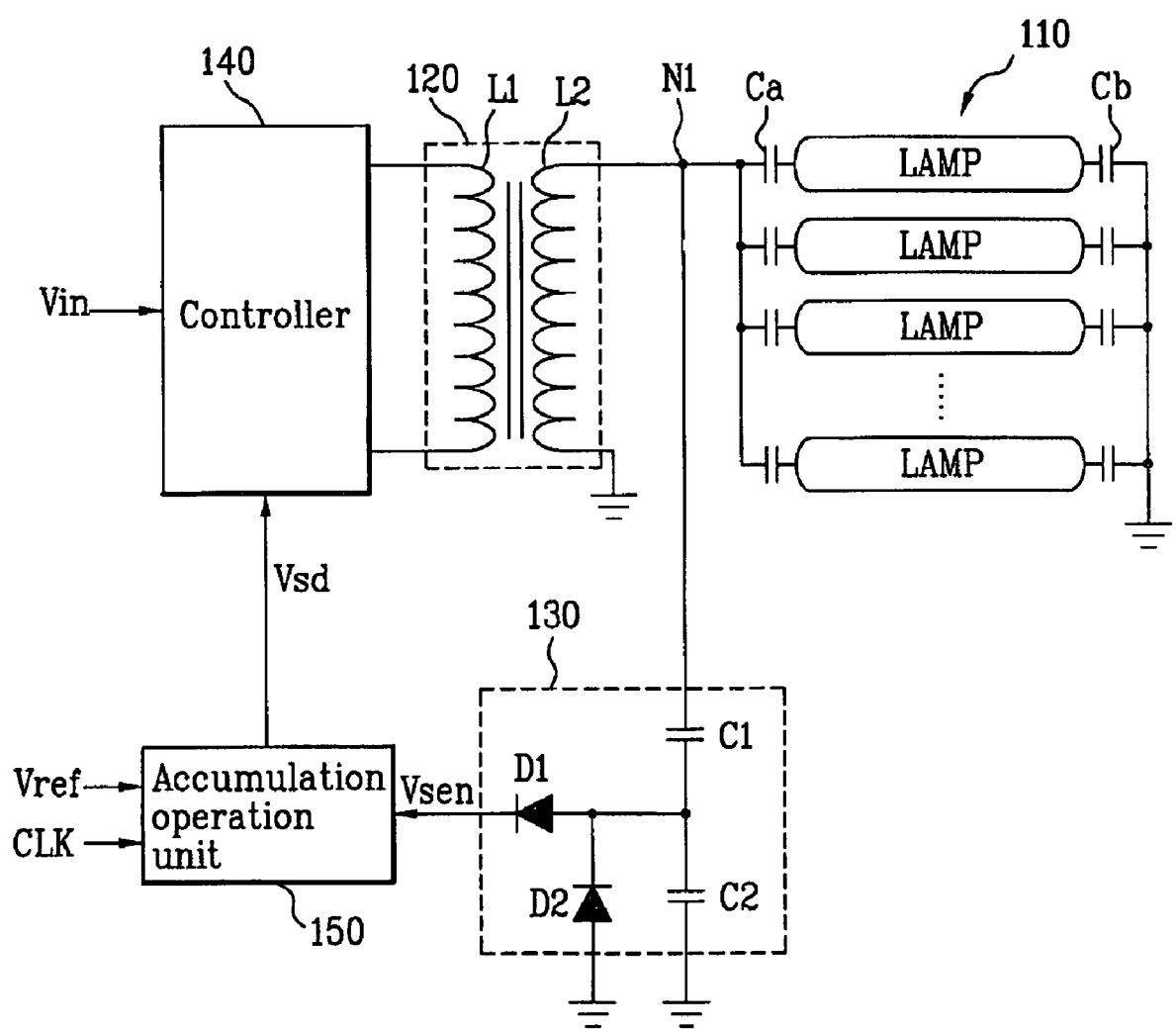
FIG. 3 illustrates a schematic block diagram of an apparatus for driving a backlight according to one embodiment of the present invention.

FIG. 3 illustrates a schematic block diagram of an apparatus for driving a backlight according to one embodiment of the present invention. As shown in FIG. 3, the apparatus for driving a backlight according to one embodiment of the present invention includes a plurality of lamps 110 each of which has first and second electrodes. A transformer 120 provides a high voltage AC waveform to drive the plurality of lamps 110 simultaneously. A detection circuit 130 generates a detection voltage Vsen corresponding to the high voltage AC waveform output from the transformer 120. An accumulation operation unit 150 accumulates detected voltage Vsen corresponding to a clock signal CLK and generates shutdown signal voltage Vsd based upon an accumulated detection voltage Vsen. A controller 140 for converting an input voltage Vin to an AC waveform that is provided to the transformer 120 and for performing shutdown of the AC waveform provided to the transformer 120 in response to an ON state shutdown signal.

The plurality of lamps 110 are lit by the high voltage AC provided by the transformer 120. The first electrode of each lamp 110 is electrically connected to an output lead N1 of the transformer 120, and the second electrode of each lamp 110 is electrically connected to the ground source. A first capacitor Ca is located between the first electrode of each lamp 110 and the output lead N1 of the transformer 120, and a second capacitor Cb is located between the second electrode and the ground source. The first and second capacitors Ca and Cb balance currents among the lamps 110 to prevent non-uniformity of brightness among the lamps 110.

The transformer 120 includes a primary coil L1 receiving an AC waveform from the controller 140 and a secondary coil L2 commonly connected to the plurality of lamps 110. The transformer 120 raises the AC waveform input via the primary coil L1 such that a high voltage AC waveform can be induced in the secondary coil L2 according to a winding ratio of the first coil L1 and secondary coil L2. Therefore, the high voltage AC waveform induced in the secondary coil L2 is output via the output lead N1 to the first electrode of each of the lamps 110.

The controller 140 converts the input voltage Vin provided from an external source into an AC waveform and provides the AC waveform to the primary coil L1 of the transformer 120. The controller 140 includes at least one switching element (not shown) for converting the input voltage Vin to the AC waveform and a switching controlling unit (not shown) for controlling the switching element. The switching element is switched according to a switching control signal of the switching controlling unit to convert the input voltage Vin to the AC waveform and then to provide the AC waveform to the primary coil L1 of the transformer 120. The switching controlling unit generates a switching control signal to control the switching element, and turns off the switching element according to the shutdown signal Vsd provided to the accumulation operation unit 150 to cut off the high AC waveform provided to the primary coil L1 of the transformer 120, thereby performing shutdown of the apparatus for driving a backlight.

The detection circuit 130, which is electrically connected to the output lead N1 of the transformer 120, generates a detection voltage Vsen corresponding to the magnitude of the high voltage AC waveform, which is commonly provided to the plurality of lamps 110 through the output lead N1, and then provides the detection voltage Vsen to the accumulation operation unit 150. In other words, the detection circuit 130 generates the detection voltage Vsen corresponding to voltage variation due to abnormal operation of each of the lamps 110. The detection circuit 130 includes first and second capacitors C1 and C2, which are serially connected between the output lead N1 and the ground source, and first and second diodes D1 and D2, which are connected to a voltage divider node N2 between the first and second capacitors C1 and C2. The first and second capacitors C1 and C2 serve to smooth the voltage corresponding to the high AC waveform output from the output lead N2 of the transformer 120, and to perform voltage division such that a divided voltage can be output to the voltage divider node N2.

The anode of the first diode D1 is electrically connected to the voltage divider node N2, and the cathode thereof is connected to the accumulation operation unit 150. The cathode of the second diode D2 is electrically connected to the voltage divider node N2, and the anode thereof is connected to the ground source. Such first and second diodes D1 and D2 rectify a voltage of the voltage divider node N2 and then provide the rectified detection voltage Vsen to the accumulation operation unit 150.

The accumulation operation unit 150 accumulates the detection voltage Vsen output from the detection circuit 130 each clock signal CLK, generates the shutdown signal voltage Vsd according to the accumulated detection voltage Vsen and provides the shutdown signals to the controller 140.

Figure 4:
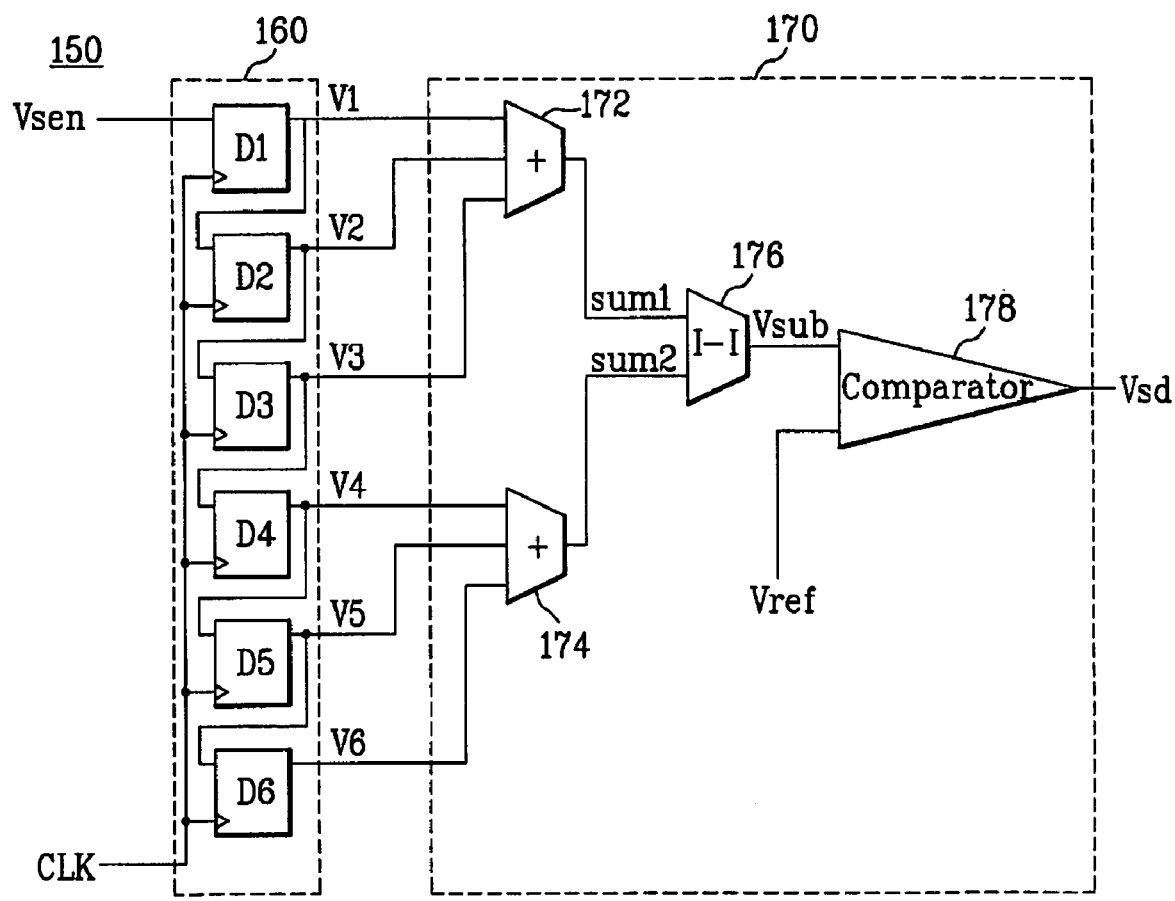
FIG. 4 illustrates a detailed circuit diagram of an accumulation operation unit of FIG. 3.
Figure 5:
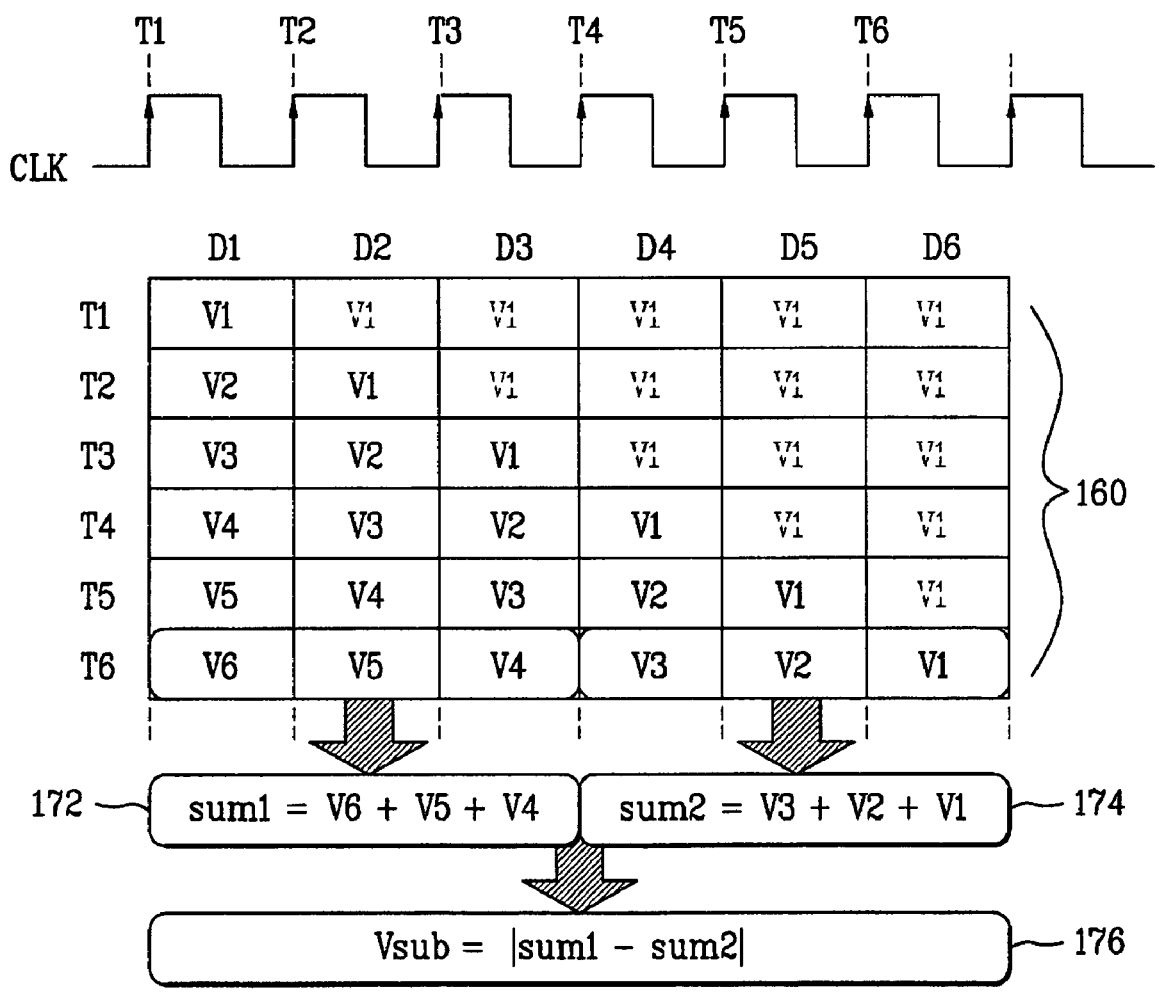
FIG. 5 illustrates views describing accumulation operations according to clock signals applied to the accumulation operation unit of FIG. 4.

FIG. 4 illustrates a detailed circuit diagram of an accumulation operation unit 150 of FIG. 3. FIG. 5 illustrates views describing accumulation operations according to clock signals applied to the accumulation operation unit 150 of FIG. 4. As shown in FIG. 4, the accumulation operation unit 150 of FIG. 4 includes a register 160 for accumulating detection voltage Vsen output from the detection circuit 130 each clock signal CLK, and a shutdown signal generation unit 170 for calculating the output voltages from the register 160 and for comparing the operated accumulation voltage with a reference voltage to generate a shutdown signal voltage Vsd and to provide the shutdown signal voltage Vsd to the controller 140.

The register 160 includes first to sixth flip-flops, D1~D6, in which the detection voltage Vsen is sequentially stored each clock signal CLK. The first flip-flop D1 stores the detection voltage Vsen from the detection circuit 130 at each rising edge of the clock signal CLK therein, and then provides the stored voltage V1 to the shutdown signal generation unit 170 and the second flip-flop D2, simultaneously. The second to fifth flip-flops, D2~D5, store voltages V1~V4 output from flip-flops D1~D4 at each rising edge of the clock signal CLK, respectively, and provide stored voltages V2~V5 to the shutdown signal generation unit 170, in which the stored voltages V2~V4 are provided to the flip-flops D3~D5, simultaneously. The sixth flip-flop D6 stores the voltage V5 output from the flip-flop D5 at each rising edge of the clock signal CLK and then provides a stored voltage V6 to the shutdown signal generation unit 170.

As shown in FIG. 5, such a register 160 sequentially stores the detection voltage Vsen from the detection circuit 130 at each rising edge of the clock signal CLK using the first to sixth flip-flops (D1~D6), and, at the same time, provides stored voltages V1~V6 to the shutdown signal generation unit 170. Although the above-mentioned register 160 is implemented with first to sixth flip-flops D1~D2, the number (N) of flip-flops is not limited to six but rather may be configured to include more than six. Namely, the number N can be an integer greater than 6.

The shutdown signal generation unit 170 includes: a first adder 172 for adding voltages V1, V2, and V3, which are stored in the first to third flip-flops D1, D2 and D3; a second adder 174 for adding voltages V4, V5 and V6, which are stored in the fourth to sixth flip-flops D4, D5 and D6; a subtractor 176 for subtracting two outputs sum1 and sum2, which are output from the first and second adders 172 and 174, respectively; and a comparator 178 for comparing a voltage Vsub output from the subtractor 176 with the reference voltage Vref to generate the shutdown signal voltage Vsd.

The first adder 172 adds voltages V1~V3 output from the first to third flip-flops D1~D3 of the register 160, respectively, at each clock signal CLK, and provides the summation sum1 to the subtractor 176. The second adder 174 adds voltages V4~V6 output from the fourth to sixth flip-flops D4~D6 of the register 160, respectively, at each clock signal CLK, and provides the summation sum2 to the subtractor 176.

The subtractor 176 subtracts the summation sum1 output from the first adder 172 and the summation sum2 output from the second adder 174, and then provides the subtraction voltage Vsub to the comparator 178. Here, the subtraction voltage Vsub output from the subtractor 176 is an absolute value.

The comparator 178 includes first and second input leads, in which the first input lead is electrically connected to the output lead of the subtractor 176 and the second input lead is electrically connected to the reference voltage Vref source. Such a comparator 178 compares the subtraction voltage Vsub output from the subtractor 176 with the reference voltage Vref to generate the shutdown signal voltage Vsd to be provided to the controller 140. More specifically, the comparator 178 generates the OFF state shutdown signal if the subtraction voltage Vsub is greater than the reference voltage Vref, and then provides the OFF state shutdown signal to the controller 140. On the other hand, if the subtraction voltage Vsub is less than the reference voltage Vref, the comparator 178 generates the ON state shutdown signal, and then provides the ON state shutdown signal to the controller 140.

As the accumulation operation unit 150 accumulates the detection voltage Vsen output from the detection circuit 130 every one of N clock signals, a large difference over a period of N clock signals can be sensed as opposed to a difference that occurs over a very long length of time or happens instantly. Thus, a slight voltage variation caused by one of the lamps 110 going open can be detected on the basis of such a large voltage difference. Therefore, a malfunction due to a shutdown unit not being able to detect such a fine voltage variation will be prevented and malfunction caused by change of peripheral temperature or change of characteristics of circuit elements can be prevented.

As such, the apparatus and method for driving a backlight according to one embodiment of the present invention serves to convert an input voltage Vin to a high voltage AC waveform using a switching element of the controller 140 and the transformer 120, and then to provide the converted high voltage AC waveform to the plurality of lamps 110, such that the plurality of lamps 110 are lit. While each of the lamps 110 is driven by the high AC waveform, the detection circuit 130 of the present invention generates the detection voltage Vsen corresponding to voltage variation of the high AC waveform output from the transformer 120. The detection voltage Vsen from the detection circuit 130 is sequentially stored in the register 160 every clock signal CLK. The detection voltages Vsen, which are stored in the register 160 each clock signal CLK, are processed by addition and subtraction during each clock signal CLK to produce the final output voltage Vsub. The final output voltage Vsub is compared with the reference voltage Vref to generate an ON state shutdown signal or an OFF state shutdown signal. The apparatus and method for driving a backlight according to the present invention serves to prevent malfunction of the shutdown circuit since the detection voltage Vsen is accumulated by the accumulation operation unit 150 such that even when the detection voltage Vsen is affected by change of peripheral temperature and/or change of characteristics of circuit elements in the shutdown circuit, the plurality of lamps 110 operate normally. The apparatus for driving a backlight according to the present invention can be used as a light source for an LCD, and can also be employed in display apparatuses requiring additional light sources, and advertisement boards, etc.

As mentioned above, the apparatus and method for driving a backlight according to the present invention serve to sequentially accumulate and store the detection voltage corresponding to currents provided to the lamps according to clock signals using a register and operation circuit, and then perform operations for the accumulated stored voltages, thereby generating the appropriate shutdown signals. Further, the embodiments of the present invention can have a reference voltage Vref set that is more reliable. Therefore, the present invention can prevent malfunction of the shutdown circuit when the detected voltage is affected by a voltage variation caused by change of peripheral temperature and change of characteristics of circuit elements.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a backlight comprising:
   a plurality of lamps each of which has first and second electrodes;
   a transformer for receiving an AC waveform to provide high voltage AC waveform to drive the plurality of lamps;
   a detection circuit for generating a detection voltage corresponding to the high voltage AC wave form;
   an accumulation operation unit for accumulating the detection voltage from the detection circuit and generating a shutdown signal voltage using the accumulated detection voltage and other stored voltages; and
   a controller for receiving an input voltage to provide the AC waveform to the transformer and for receiving the shutdown signal voltage to shutdown the plurality of lamps in response to the shutdown signal voltage, wherein the accumulation operation unit includes:
   a register for sequentially storing the detection voltage therein according to a clock signal; and
   a shutdown signal generation unit for calculating the stored voltages output from the register according to the clock signal and generating the shutdown signal voltage.

2. The apparatus as set forth in claim 1, wherein the register includes N flip-flops, in which N is positive integer greater than one.

3. The apparatus as set forth in claim 1, wherein the shutdown signal generation unit includes:
   a first adder for adding 1-st to N/2-th stored voltages output from the register according to the clock signal;
   a second adder for adding N/2+1-th to N-th stored voltages output from the register according to the clock signal;
   a subtractor for calculating an absolute value of a difference of voltages output from the first and the second adders, respectively, and outputting an absolute value voltage; and
   a comparator for comparing a reference voltage with the absolute value voltage from the subtractor and generating the shutdown signal voltage based on the comparison.

4. The apparatus as set forth in claim 1, wherein the plurality of lamps is driven in parallel by the transformer.

5. The apparatus as set forth in claim 1, wherein the detection circuit is connected to a node between a secondary winding of the transformer and the plurality of lamps.

6. A method for driving a backlight including a plurality of lamps each of which has first and second electrodes, comprising:
   converting an input voltage to an AC waveform;
   converting the AC waveform to a high voltage AC waveform using a transformer and providing the high voltage AC waveform to drive the plurality of lamps;
   generating a detection voltage corresponding to the high voltage AC waveform output from the transformer to the plurality of lamps; and
   accumulating the detection voltage during each clock signal and generating a shutdown signal voltage using the accumulated detection voltage and other stored voltages, wherein the generating the shutdown signal voltage includes:
   sequentially storing the detection voltage in a register according to the clock signal; and
   calculating the stored voltages output from the register according to the clock signal, and generating the shutdown signal voltage.

7. The method as set forth in claim 6 wherein the step generating the shutdown signal includes:
   adding 1-st to N/2-th stored voltages output from the register according to the clock signal; adding N/2+1-th to N-th stored voltages output from the register according to the clock signal;
   calculating an absolute value of a difference of voltages generated from the additions, respectively, and outputting an absolute value voltage; and
   comparing a reference voltage with the absolute value voltage generated from the calculation, and generating the shutdown signal voltage based on the comparison.

8. The method as set forth in claim 6, wherein the plurality of lamps are driven in parallel by the transformer.

9. The method as set forth in claim 6, wherein the detection voltage is received from a node between a secondary winding of the transformer and the plurality of lamps.

10. The method as set forth in claim 6, further comprising:
    performing shutdown of the plurality of lamps in response to the shutdown signal voltage being the ON state shutdown signal.

11. An apparatus for driving a backlight comprising:
    a plurality of lamps each of which has first and second electrodes;
    a transformer for receiving an AC waveform to provide high voltage AC waveform to drive the plurality of lamps;
    a clock for providing a clock signal;
    a detection circuit for generating a detection voltage corresponding to the high voltage AC waveform;
    an accumulation operation unit for receiving the detection voltage from the detection circuit each clock signal and generating a shutdown signal voltage using the accumulated detection voltage and other stored voltages; and
    a controller for receiving an input voltage to provide the AC waveform to the transformer and for receiving the shutdown signal voltage, wherein the accumulation operation unit includes:
    a register to sequentially store the detection voltage therein according to the clock signal; and
    a shutdown signal generation unit for calculating the stored voltages output from the register according to the clock signal and generating the shutdown signal voltage.

12. The apparatus as set forth in claim 11, wherein the register includes N flip-flops, in which N is positive integer greater than one.

13. The apparatus as set forth in claim 11, wherein the shutdown signal generation unit includes:
    a first adder to add 1-st to N/2-th stored voltages output from the register according to the clock signal;
    a second adder to add N/2+1-th to N-th stored voltages output from the register according to the clock signal;
    a subtractor to calculate an absolute value voltage of a difference of voltages output from the first and the second adders, respectively, and to output the absolute value voltage; and
    a comparator to compare a reference voltage with the absolute value voltage from the subtractor and to generate the shutdown signal voltage based on the comparison.

14. The apparatus as set forth in claim 11, wherein the plurality of lamps is driven in parallel by the transformer.

15. The apparatus as set forth in claim 11, wherein the detection circuit is connected to a node between a secondary winding of the transformer and the plurality of lamps.

* * * * *